Patented Sept. 2, 1952

2,609,284

UNITED STATES PATENT OFFICE 2,609,284

COATED ABRASIVE ARTICLE AND METHOD OF MAKING

Leonard R. Nestor, St. Paul, Minn., assignor to Minnesota Mining & Manufacturing Company, St. Paul, Minn., a corporation of Delaware No Drawing. Application June 28, 1947, Serial No. 757,929

7 Claims. (Cl. 51—302)

This invention relates to abrasive coated articles and methods of making. In particular, it is concerned with the production of sandpaper or abrasive sheet material wherein the abrasive grit is bonded to the supporting backing by a binder composition comprising a modified starch adhesive.

Coated abrasive sheet material, such as sandpaper, comprises generally a base of flexible sheet material such as paper or cloth, a more or less finely comminuted resistant material having abrading properties, such as garnet, flint, corundum or the like, and a binder, generally in the form of a glue or resinous bond, which serves to bind the abrasive particles to the base. The binder is conveniently applied in two separate coatings, one before and one after the application of the abrasive grains, i. e. as "abrasive bond" and "abrasive size" coats, and is ultimately "cured" by heating or drying.

Various modifications of starch have in the past been successfully employed as adhesives for many purposes. For bonding plywood, or sizing cloth, or other similar applications, these prior art starch adhesives have been quite satisfactory. The requirements of adhesives for use in the coated abrasive art are, however, much more severe. The use of starch adhesives in the bonding of abrasive grits to flexible backings, for the production of sandpaper, has not previously been successfully attempted, as far as I am aware.

An outstanding requirement of adhesives designed for the manufacture of coated abrasive products is high bonding strength. This term implies a strongly adherent bond to the abrasive grid and to the paper or other backing as well as a high internal strength and toughness within the binder film itself.

Another requirement, particularly as regards commercial operations, is controlled viscosity-concentration relationship. Adhesives having too high a viscosity cannot be successfully spread or coated on the usual sandpaper coating machines. Dilution of such adhesives to a spreadable viscosity then reduces the solids content of the binder and results in an inadequate coating weight and in other difficulties. Too low a viscosity, even at high concentration, usually indicates a weak adhesive, and frequently causes difficulty from flowing of the adhesive on the coated sheet.

In producing a wide variety of coated abrasive products, with various types and sizes of abrasive grains, many different adhesive compositions are required. Thus, the abrasive bond composition is customarily more viscous and more concentrated than the sizing composition. Additives or extenders, such as inert powders or the like, may be introduced for one purpose or another, and will have an effect on both solids content and viscosity. The amount of binder, and hence its viscosity and solids content, required for a specific coated abrasive article will depend, among other things, on the grit size of the abrasive grains. The nature of the paper, cloth or other backing material must also be taken into consideration in defining the properties of the binder prior to its application. The temperature of application may vary within quite wide limits. Adhesives which meet the requirements as to solids content and spreadability or coatability after being thus diluted, compounded, heated, or otherwise prepared for use in the making of sandpaper are found to come within the approximate limits of 1000 to 8000 centipoise viscosity and 40–50 percent solids when measured at 45° C. I produce by my invention compositions which, in addition to coming within this viscosity and concentration range, are fully adequate both in adhesion to abrasive grit and in internal strength and toughness of the dried film, and are therefore fully suited to the manufacture of coated abrasive articles of the nature of sandpaper.

My invention additionally provides many other advantages. The process employed may be carried out in a continuous operation, producing the finished adhesive composition directly from the raw starch, or it may be broken down into individual and separate steps for greater flexibility if desired. The dried adhesive film is tough and strong, and holds the abrasive grit firmly bonded to the backing under the intense strains encountered during abrading operations, yet is sufficiently flexible for all normal use. The coated abrasive sheet material has superior resistance to grit loss during abrading operations, and does not deteriorate at elevated temperatures under test conditions or normal conditions of storage or use. The abrasive article contains no proteinaceous components and is accordingly less susceptible to the destructive action of certain bacteria. By the use of a modified starch abrasive bond in accordance with this disclosure, there results an abrasive article having long life and durability, as well as a strong granular bond.

These and other advantages may be conveniently obtained, according to my invention, by employing, as a grit binder, adhesive compositions made by treating raw starch or analogous material with an oxidizing agent to a predetermined end-point, and subsequently converting the treated starch to a viscous fluid adhesive condition by the addition of an active base, e. g. sodium hydroxide. Specific details of exemplary procedures will now be set forth in order more clearly to describe and illustrate the invention, but without any intention of being limited thereto. In the following examples, all parts are given as parts by weight unless otherwise specified.

*Example 1*

To a suspension of 100 parts of potato starch in 114 parts of water at 100° F. was added 10 parts of a solution of sodium hypochlorite analyzing 14% available chlorine and having a specific gravity of about 1.2. The mixture, which was in the form of a rather fluid slurry, was continuously stirred, and portions were removed periodically for determination of acidity and for further treatment. The initial mixture was found to be slightly alkaline and to have a pH value of approximately 8.5–9.0; the pH rapidly decreased as the reaction proceeded, the solution soon becoming acidic.

To a portion of the above acidic slurry, after determination of its pH value, was then added a quantity of a 50% aqueous solution of sodium hydroxide sufficient to form a homogeneous solution. The addition of the base immediately stops the reaction between starch and oxidizing agent, and converts the reacted starch slurry to a smooth, viscous solution of somewhat darker color. The viscosity at this stage is found to be dependent both on the extent of the reaction between starch and hypochlorite, as measured by the reduction in pH value of the slurry, and by the amount of sodium hydroxide added in excess of that amount just sufficient to produce a homogeneous smooth solution. In the present example, 3.34 parts of the sodium hydroxide solution was added to 30 parts of the reacted starch slurry to obtain adhesive compositions containing 45% solids and having the following viscosities:

| Sample No. | reaction time minutes | pH of slurry | viscosity of adhesive cps. at 45° C. |
| --- | --- | --- | --- |
| 1 | 18 | 6.95 | 6,900 |
| 2 | 25 | 6.18 | 4,400 |
| 3 | 90 | 5.00 | 2,050 |
| 4 | 240 | 4.27 | 1,600 |

It is to be noted that the alkali is here present in the ratio of 12.5 parts of alkali to 100 parts of the starch initially present, whereas only about 10 parts of alkali was required to convert the mixture to a smooth, viscous and homogeneous solution. The additional alkali provided a solution of somewhat improved fluidity and stability.

Portions of these adhesives were cast in film form. The dried films of samples 1 and 2, having initial viscosities of at least about 3000 cps., were found to be self-supporting, whereas the others cracked or broke apart during drying. However, it was found that the addition to the liquid adhesive of a powdered inert filler, such as ground limestone or silica dust, improved the film-forming abilities of the adhesive sufficiently so that self-supporting films could be formed of modified starch adhesives having initial viscosities as low as about 1000 cps. Finely ground limestone filler was therefore added, in an amount equivalent to 30–50% of the total volume of the dried film, to the adhesive compositions, which as employed in the manufacture of sandpaper were compounded to the following formulas in parts by weight:

| | dry adhesive | filler | water |
| --- | --- | --- | --- |
| Abrasive bond coat | 31.2 | 26.7 | 42.1 |
| Abrasive size coat | 15.4 | 26.5 | 58.1 |

Grit 1½ flint paper (sandpaper carrying grit 1½ flint abrasive grains) was prepared using these various adhesive compositions. The adhesives coated equally as well as the conventional animal glue compositions. They required somewhat longer drying time or higher drying temperature than the corresponding animal glue adhesives used in the same amount.

The finished abrasive sheet was tested by rubbing a weighed strip under constant pressure against a similar strip and determining the resulting unit loss in weight. Grit 1½ flint paper having an animal glue bond and size coat is considered satisfactorily to pass this "rub test" if the loss of weight is 3–5 percent or less. Using the described starch base adhesives, the rub test values were as follows:

| sample No. | initial viscosity | loss in rub test |
| --- | --- | --- |
| | | *percent* |
| 1 | 6,900 | 2–4 |
| 2 | 4,400 | 4.4 |
| 4 | 1,600 | 6.2 |

The sodium hypochlorite solution used in the above example may be prepared by passing chlorine into a solution of sodium hydroxide, or in any other convenient manner. The strength of the solution, expressed in terms of "percent available chlorine," is conveniently determined by addition of a portion to acidic iodide solution and titration of the liberated iodine with standard thiosulfate solution. For economical and safe operation, the solution should contain approximately the indicated amount of available chlorine, although other concentrations have also been found useful.

The hypochlorite solution may be added to the starch slurry as indicated, or may be added to the water before the addition of the starch. In the latter case, the starch should be mixed in rapidly so as to ensure equal reaction of all portions.

Various other oxidizing agents may be employed in place of hypochlorites in making my improved adhesive compositions and coated abrasive products, and the steps of oxidation and conversion may or may not be carried out in a continuous process, as desired. The method of preparation hereinabove described has, however, been found highly effective when applied to the manufacture of coated abrasive articles of the nature of sandpaper.

*Example 2*

In this example, acidic permanganate solution serves as the oxidizing agent, and consequently somewhat greater precautions as regards corrosion-resistant equipment, etc., must be taken. This oxidizing agent has the advantage over the hypochlorite of reacting rapidly to a definite and pre-determined end-point; and the reaction is non-exothermic. For any particular sample of starch, a definite amount of permanganate is found to produce a definite and reproducible decrease in the viscosity of the alkali-converted adhesive.

Sandpaper was prepared, using a permanganate-treated starch adhesive, by a process similar in general to that described under Example 1. A pre-formed slurry of 2700 parts of potato starch in water containing 120 parts of concentrated hydrochloric acid was treated with potassium permanganate, added in the form of a 5% solution. At the completion of the reaction, at which point the purplish-brown color was completely discharged, 960 parts of 50% sodium hydroxide solution was added; approximately 100 parts was required to neutralize the hydrochloric acid, leaving about 15.9 parts of NaOH available for each 100 parts of starch initially present, of which about 10 parts was just sufficient to provide a homogeneous solution. The resulting smooth and stable solution, having a solids content of 45%, was tested for viscosity. The adhesive was compounded with inert, finely divided filler and used for the production of grit 1½ flint paper, as in Example 1. The effect of increasing amounts of permanganate on the initial viscosity of the adhesive solution and on the rub test of the finished sandpaper is shown in the following table.

| $KMnO_4$, parts by wt. | viscosity, cps., 45° C. | loss in rub test, percent |
|---|---|---|
| 5.75 | 4,500 | 3.6 |
| 9.25 | 1,600 | 5.6 |
| 24.25 | 691 | 8.2 |

The oxidation of the starch has been successfully carried out at temperatures from 80° F., at which the reaction is quite slow, to 120–125° F.; at higher temperatures the starch is gelatinized.

Potato starch, specified in the examples, has been successfully replaced by other varieties of starch, e. g., corn starch, sago starch, and even by certain modifications of cellulose. Air-dry starch normally contains about 10% moisture, conveniently determined by azeotropic distillation with toluene by the Bidwell-Sterling method. Where the moisture content differs significantly from this value, corresponding changes are made in the weight of air-dry starch shown in the formulas given.

Sodium hydroxide is effective in rapidly and completely converting the mixture of treated starch and water to the viscous adhesive state. As previously noted, a minimum amount is required to thus convert all of the treated starch and to produce a smooth homogeneous solution; small additional amounts then rapidly reduce the viscosity of the solution. Even with these added amounts of base, the adhesive does not appear to be particularly irritating to the skin, nor deleterious to paper or other backing materials. The presence of much larger quantities of sodium hydroxide or the like in the dried adhesive film causes undesirable weakening of the film and is to be avoided. In general, amounts of base equivalent to about 10–12 parts of sodium hydroxide for 100 parts of starch are found to produce the best results, although 9 parts are ordinarily sufficient to convert the starch to a homogeneous solution, and up to about 16 parts have produced useful adhesive compositions.

Potassium hydroxide, sodium metasilicate, or quaternary ammonium or sulfonium bases are equally as effective as sodium hydroxide in the preparation of the converted starch adhesive. Lithium hydroxide is less soluble and hence somewhat less effective. Ammonium hydroxide by itself will not convert the slurry of reacted starch to the smooth viscous adhesive condition, but may be used successfully in conjunction with small amounts of stronger bases such as sodium hydroxide. Calcium hydroxide forms undesirable insoluble lime salts.

The modified starch adhesive used in preparing my novel abrasive sheet material may be "filled" or compounded with powdered calcium carbonate or other inert filler, as shown, in which case adhesives of somewhat reduced initial viscosity (i. e., viscosity of the converted starch solution just subsequent to addition of sodium hydroxide or the like) and reduced film strength may successfully be employed. Adhesives having a higher initial viscosity, and correspondingly higher film strength, may be used as abrasive bond and abrasive size coatings without the addition of any filler, producing abrasive coated articles having advantages over similar articles produced with animal glue adhesives. (The addition of small amounts of untreated starch to the adhesive has been considered as a means of increasing the viscosity, but such additions do not significantly increase the film strength.) The starch base adhesive may also be used in conjunction with other adhesives. For example, it may be blended with glue, casein, sodium silicate, etc.; or it may be used as either the abrasive bond coat or the sizing coat in conjunction with other known bonds or sizings. Thus, sandpaper having a modified starch abrasive bond may be sized with animal glue or with synthetic resin. In the latter case, the alkali content of the bond coat may serve as a catalyst to increase the rate of gelation or hardening of a properly selected synthetic resin size coat, e. g. a size coat comprising a resorcinol-aldehyde or other phenolaldehyde resin. In all cases, abrasive coated sheet material is produced which has superior properties heretofore considered impossible of attainment with starch base adhesive compositions.

What I claim is:

1. A flexible abrasive article of the nature of sandpaper, having abrasive grits adhesively bonded to a flexible backing by a binder comprising the dried residue of a distinctly alkaline concentrated spreadable viscous adhesive solution of alkaline converted oxidized starch, said solution at a concentration of about 40–50% solids having a viscosity of about 1000–8000 centipoises when measured at 45° C. and being prepared by reacting together, at a temperature of at least about 80° F. but less than that required for gelatinization of the starch, and to a moderately acid pH value, a concentrated aqueous slurry of 100 parts of starch and 10 parts of a sodium hypochlorite solution of 1.2 specific gravity and 14% available chlorine, and then terminating the reaction and simultaneously converting the mass to said distinctly alkaline adhesive solution by adding 9–16 parts of sodium hydroxide.

2. A flexible abrasive article of the nature of sandpaper, having abrasive grits adhesively bonded to a flexible backing by a binder comprising the dried residue of a concentrated spreadable viscous adhesive solution of alkaline converted oxidized starch, said solution at a concentration of about 40–50% solids having a viscosity of about 1000–8000 centipoises when measured at 45° C. and being prepared by mixing starch and a water-soluble oxidizing agent in water and oxidizing the starch, at a temperature of at least about 80° F. but less than that required for gelatinization of the starch, and without substantially reducing its internal strength, to a predetermined end-point at a moderately acid pH value, and then neutralizing the acid and converting the mass to a distinctly alkaline, homogeneous viscous fluid adhesive mass by adding an active alkali, from the class consisting of the alkali metal hydroxides and sodium metasilicate, in an amount equivalent to 9–16 parts of sodium hydroxide for 100 parts of unoxidized starch.

3. The product of claim 2 in which the water-soluble oxidizing agent is a hypochlorite.

4. The product of claim 2 in which the water-soluble oxidizing agent is a permanganate.

5. A flexible abrasive article of the nature of sandpaper, having abrasive grits adhesively bonded to a flexible backing by a binder comprising the dried residue of a concentrated spreadable viscous adhesive solution of alkaline converted oxidized starch, said solution at a concentration of about 40–50% solids having a viscosity of about 1000–8000 centipoises when measured at 45° C. and being prepared by reacting together, at a temperature of at least about 80° F. but less than that required for gelatinization of the starch, and at a moderately acid pH value, a concentrated aqueous slurry of 2700 parts of starch and about 6 parts of potassium permanganate, and then neutralizing the acid and converting the oxidized starch to a distinctly alkaline, homogeneous viscous fluid adhesive mass by adding 9–16 parts of sodium hydroxide for each 100 parts of the unoxidized starch.

6. A flexible abrasive article of the nature of sandpaper, having abrasive grits adhesively bonded to a flexible backing by a grit bonding coat and a surface sizing coat, said grit bonding coat comprising the alkali-converted oxidized starch product formed by oxidizing starch, at a temperature of at least about 80° F. but less than that required for gelatinization of the starch, to a predetermined end-point at a moderately acid pH value without substantially reducing its internal strength, and converting to a distinctly alkaline, viscous fluid adhesive mass of high bonding strength, having a viscosity of about 1000–8000 centipoises at a concentration of about 40–50% solids when measured at 45° C., by adding an active base from the class consisting of alkali metal hydroxides and sodium metasilicate in an amount equivalent to 9–16 parts of sodium hydroxide for each 100 parts of unoxidized starch, and said surface sizing comprising an alkali-catalyzed synthetic phenolic resin.

7. A coated abrasive sheet material of the nature of sandpaper, having abrasive grits adhesively bonded to a flexible backing by a binder composition comprising the alkali-converted oxidized starch product formed by oxidizing starch, at a temperature of at least about 80° F. but less than that required for gelatinization of the starch, to a predetermined end-point at a moderately acid pH value without substantially reducing its internal strength, and converting to a distinctly alkaline viscous fluid adhesive mass having a viscosity of about 1000–8000 centipoises at a concentration of about 40–50% solids when measured at 45° C., by adding an active base from the class consisting of alkali metal hydroxides and sodium metasilicate in an amount equivalent to 9–16 parts of sodium hydroxide for 100 parts of the unoxidized starch.

LEONARD R. NESTOR.

REFERENCES CITED

The following references are of record in the file of this patent:

UNITED STATES PATENTS

| Number | Name | Date |
|---|---|---|
| 646,724 | Brueder | Apr. 3, 1900 |
| 769,061 | David | Aug. 30, 1904 |
| 779,583 | Brooks | Jan. 10, 1905 |
| 1,567,609 | MacMillan | Dec. 29, 1925 |
| 1,618,822 | Hartmann et al. | Feb. 22, 1927 |
| 1,623,222 | Werder | Apr. 3, 1927 |
| 1,904,619 | Caesar | Apr. 18, 1933 |
| 1,994,238 | Martin | Mar. 12, 1935 |
| 2,108,862 | Kerr | Feb. 22, 1938 |
| 2,173,041 | Muller | Sept. 12, 1939 |
| 2,173,796 | Oglesby | Sept. 19, 1939 |

FOREIGN PATENTS

| Number | Country | Date |
|---|---|---|
| 167,275 | Germany | Jan. 31, 1906 |
| 79,569 | Australia | Apr. 15, 1919 |

OTHER REFERENCES

Kerr, "Starch" (1944), pp. 235–239.